US012748178B2

(12) United States Patent
Hanai et al.

(10) Patent No.: US 12,748,178 B2
(45) Date of Patent: Sep. 29, 2026

(54) DISTANCE SENSOR MODULE

(71) Applicant: HOSIDEN CORPORATION, Osaka (JP)

(72) Inventors: Tadashi Hanai, Osaka (JP); Takeshi Isoda, Osaka (JP); Naoki Toyota, Osaka (JP)

(73) Assignee: HOSIDEN CORPORATION, Osaka (JP)

( * ) Notice: Subject to any disclaimer, the term of this patent is extended or adjusted under 35 U.S.C. 154(b) by 218 days.

(21) Appl. No.: 18/221,151

(22) Filed: Jul. 12, 2023

(65) Prior Publication Data

US 2024/0019536 A1 Jan. 18, 2024

(30) Foreign Application Priority Data

Jul. 15, 2022 (JP) ................................ 2022-114142

(51) Int. Cl.

*G01S 7/02* (2006.01)
*G01F 23/284* (2006.01)
*G01S 13/88* (2006.01)

(52) U.S. Cl.

CPC ............ *G01S 7/027* (2021.05); *G01F 23/284* (2013.01); *G01S 13/88* (2013.01)

(58) Field of Classification Search

CPC .......... G01S 7/027; G01S 13/88; G01S 13/08; G01S 15/08; G01S 7/4813; G01S 7/521; G01S 17/08; G01F 23/284; G01F 23/28

See application file for complete search history.

(56) References Cited

U.S. PATENT DOCUMENTS

| | | | |
|---|---|---|---|
| 4,487,065 A | 12/1984 | Carlin et al. | |
| 2006/0201245 A1 | 9/2006 | Huber et al. | |

(Continued)

FOREIGN PATENT DOCUMENTS

| | | | |
|---|---|---|---|
| CN | 105936242 A * | 9/2016 | ............ B60R 11/04 |
| JP | S61073290 U | 5/1986 | |

(Continued)

OTHER PUBLICATIONS

Search Report issued Dec. 4, 2023 in European appln. No. 23184577.7.

(Continued)

*Primary Examiner* — William Kelleher
*Assistant Examiner* — Ismaaeel A. Siddiquee
(74) *Attorney, Agent, or Firm* — Dilworth & Barrese, LLP.; Michael J. Musella, Esq.

(57) ABSTRACT

A distance sensor module includes a distance sensor and a housing. The distance sensor includes a sensor body and a transmission and reception section connected to the sensor body and configured to emit a detection signal toward a measurement target and receive the detection signal as reflected by the measurement target. The distance sensor is configured such that the sensor body is configured to measure the distance between the distance sensor and the measurement target as a result of the transmission and reception section receiving the detection signal. The housing includes a sensor container section containing the distance sensor, and an attachment section configured to attach the sensor container section to an external attachment target. The sensor container section is configured to keep the transmission and reception section so oriented due to gravity as to have a vertically downward detection direction with the attachment section attached to the attachment target.

16 Claims, 5 Drawing Sheets

(56) References Cited

U.S. PATENT DOCUMENTS

| | | | | |
|---|---|---|---|---|
| 2011/0050525 | A1 | 3/2011 | Sanada et al. | |
| 2011/0083504 | A1* | 4/2011 | Unger | G01F 22/00 73/304 C |
| 2015/0241261 | A1 | 8/2015 | Cheng et al. | |
| 2019/0056258 | A1* | 2/2019 | Gelada Camps | G01F 23/292 |
| 2021/0257140 | A1* | 8/2021 | Chen | H01F 7/122 |
| 2023/0130890 | A1* | 4/2023 | Hengstler | G01F 23/284 73/290 R |
| 2023/0296422 | A1* | 9/2023 | Laun | G01S 13/88 342/124 |

FOREIGN PATENT DOCUMENTS

| | | | |
|---|---|---|---|
| JP | H05-015968 | U | 3/1993 |
| JP | H5-52622 | A | 3/1993 |
| JP | 10096661 | A | 4/1998 |
| JP | 11064070 | A | 3/1999 |
| JP | 2001-219846 | A | 8/2001 |
| JP | 3689399 | B2 | 8/2005 |
| JP | 2007-33162 | A | 2/2007 |
| JP | 2015-10403 | A | 1/2015 |
| JP | 2017-207400 | A | 11/2017 |
| WO | 2021/209129 | A1 | 10/2021 |
| WO | 2021/209162 | A1 | 10/2021 |

OTHER PUBLICATIONS

Notice of Reasons for Refusal in Japanese Patent Application No. 2022-114142 issued Oct. 29, 2025.

Notice of Reasons for Refusal in Japanese Patent Application No. 2022-114142 dated Feb. 24, 2026.

* cited by examiner

DISTANCE SENSOR MODULE

CROSS REFERENCE TO RELATED APPLICATION

This application is based on and claims priority under 35 U.S.C. Section 119 to Japanese Patent Application No. 2022-114142 filed on Jul. 15, 2022, the entire content of which are incorporated herein by reference.

TECHNICAL FIELD

This disclosure relates to a distance sensor module.

RELATED ART

JPH05-52622A discloses as a distance sensor module a water surface sensor configured to use an ultrasonic wave to detect the surface of water in a water channel in a non-contact manner.

JP2015-10403A discloses as a distance sensor module a water level sensor disposed on the reverse face (lower face) of the body of a cover of a manhole and connected to a wireless communication controller through a connection cable.

JP2017-207400A discloses as a distance sensor module a water gauge including a light source and a light position detector of a non-contact type. The light source includes a light-emitting diode configured to emit a light beam toward a water surface. The light position detector includes a position sensitive detector configured to receive a light beam as reflected by a water surface to detect the position of the light reception.

SUMMARY

A distance sensor module may be simply disposed, as disclosed in JP2015-10403A, on the lower face of a cover of a manhole to detect the surface of water flowing through a pipe.

Distance sensor modules for measuring the level of water in a pipe are classified into a contact type and a non-contact type, depending on the method of measurement. Distance sensor modules of the contact type include those of a float type, a guide rope type, a pressure type as disclosed in JP2015-10403A, an electrical capacitance type, and a differential pressure type. Distance sensor modules of the non-contact type include those of an electric wave type, an ultrasonic wave type as disclosed in JPH05-52622A, and an optical type as disclosed in JP2017-207400A.

Distance sensor modules of the contact type are relatively inexpensive, but may be deformed or damaged through contact with an object in water or become incapable of normal measurement due to adhesion of an object. Further, a distance sensor module of the contact type, when installed or maintained, needs to have its sensor in water flowing through the pipe. The maintenance requires a lot of time and effort, possibly necessitating draining water and adjusting the zero point each time, and needs to be performed at a short cycle.

Distance sensor modules of the non-contact type, on the other hand, are not deformed or damaged and may be maintained easily, as opposed to the contact type. On the down side, a distance sensor module of the non-contact type needs adjustment to keep a predetermined angle to the water surface. A distance sensor module of the non-contact type needs to be oriented with high accuracy if, for instance, the distance sensor module is intended to emit a detection signal vertically downward, that is, in a direction at an angle of 90 degrees to the water surface.

In view of the above issue, a distance sensor module of the non-contact type will require distance calculation based on an intended angle if the distance sensor module is (i) configured to emit an ultrasonic wave or a light beam as a detection signal (as in JPH05-52622A or JP2017-207400A) toward a water surface and detect the detection signal as reflected by the water surface to measure the distance between the distance sensor module and the water surface and (ii) intended to emit the detection signal in a direction at an angle other than 90 degrees to the water surface.

As described above, a distance sensor module configured to detect a water surface with use of a detection signal needs to emit the detection signal vertically downward to facilitate the measurement and keep high measurement performance. None of JPH05-52622A, JP2015-10403A, and JP2017-207400A discloses orienting a distance sensor module to improve measurement accuracy.

Managing a pipe may involve opening and closing a cover of the manhole. If, for instance, the cover has been closed in a tilted or otherwise inappropriate orientation, the distance sensor module on the lower face of the cover is also inappropriately oriented. This may lead to the distance sensor module inaccurately measuring the position of a water surface.

Such a concern arises not only when the measurement target is water, but also when it is a fluid other than water or a solid.

The above circumstances have led to a demand for a distance sensor module capable of accurately measuring the distance between the distance sensor module and a measurement target even in an inappropriate orientation.

A distance sensor module according to this disclosure includes: a distance sensor; and a housing, the distance sensor including: a sensor body; and a transmission and reception section connected to the sensor body and configured to emit a detection signal toward a measurement target and receive the detection signal as reflected by the measurement target, the distance sensor being of a non-contact type such that the sensor body is configured to measure a distance between the distance sensor and the measurement target as a result of the transmission and reception section receiving the detection signal, the housing including: a sensor container section containing the distance sensor; and an attachment section configured to attach the sensor container section to an external attachment target, the sensor container section being configured to keep the transmission and reception section so oriented due to gravity as to have a vertically downward detection direction with the attachment section attached to the attachment target.

The above configuration keeps the transmission and reception section so oriented due to gravity as to have a vertically downward detection direction with the housing attached to the attachment target with use of the attachment section. This allows the distance sensor to keep an appropriate orientation relative to a measurement target even if the attachment target has changed its orientation. The distance sensor module is thus capable of accurately measuring the distance between the distance sensor module and a measurement target even in an inappropriate orientation.

The distance sensor module may be further configured such that the transmission and reception section faces the measurement target, and the distance sensor has a center of gravity on a central axis of the transmission and reception section.

Orienting the distance sensor so that its center of gravity is on the central axis of the transmission and reception section allows the distance sensor to emit a detection signal vertically downward due to gravity.

The distance sensor module may be further configured such that the sensor container section contains the distance sensor in such a manner that allows the distance sensor to change an orientation within a predetermined space.

With the above configuration, the distance sensor is capable of changing its orientation only within a predetermined space, and does not come into contact with the inner surface of the housing.

The distance sensor module may be further configured such that the sensor container section has a lower end protruding downward by such an amount that when the distance sensor has changed an orientation within a predetermined space, no portion of the distance sensor protrudes downward from the lower end in a side view.

With the above configuration, when the distance sensor has been tilted maximally, no portion of the distance sensor protrudes downward from the lower end of the sensor container section in a side view. The sensor container section thereby protects the distance sensor against breakage when the distance sensor module is on the lower face of a manhole cover and has received an impact from the cover due to its weight such as when the cover has been dropped onto the ground by mistake.

The distance sensor module may further include: a restrictor configured to limit a change of an orientation of the distance sensor relative to the sensor container section.

The restrictor prevents the distance sensor in the sensor container section from changing its orientation beyond the limits.

The distance sensor module may further include: a fixing member configured to fix the distance sensor in such a manner as to prevent the distance sensor from changing an orientation.

The fixing member prevents the distance sensor in the sensor container section from changing its orientation, and thereby prevents the distance sensor from coming into strong contact with the inner surface of the housing due to vibration or the like.

The distance sensor module may be further configured such that the distance sensor is contained in the sensor container section in such a manner as to be capable of swinging to change an orientation relative to the housing, a first one of the distance sensor and the housing includes a swing axis section, whereas a second one of the distance sensor and the housing includes a swing support holding the swing axis section, and that one of the swing axis section and the swing support which the distance sensor includes has a center vertically upward of a center of gravity of the distance sensor.

With the above configuration, when the housing becomes oriented inappropriately, the distance sensor is swung about the swing axis section with the swing axis section held by the swing support. This allows that one of the swing axis section and the swing support which the distance sensor includes to have a center vertically upward of the center of gravity of the distance sensor. This in turn allows the distance sensor to emit a detection signal vertically downward.

The distance sensor module may be further configured such that the housing includes the swing axis section at the attachment section whereas the distance sensor includes the swing support, the swing axis section protrudes upward and has a gradually smaller diameter toward an upper end thereof, and the swing support is a depressed surface section open downward and in contact with the upper end of the swing axis section.

The swing axis section extends upward and has a gradually smaller diameter toward its upper end, whereas the swing support is a depressed surface section open downward and in contact with the upper end of the swing axis section. This allows the distance sensor to be suspended at the position of the contact as a holding point and thereby to emit a detection signal vertically downward.

The distance sensor module may be further configured such that the distance sensor includes the swing axis section whereas the housing includes the swing support at the attachment section, the swing axis section protrudes downward and has a gradually smaller diameter toward a lower end thereof, and the swing support is a depressed surface section open upward and in contact with the lower end of the swing axis section.

The swing axis section extends downward and has a gradually smaller diameter toward its lower end, whereas the swing support is a depressed surface section open upward and in contact with the lower end of the swing axis section. This allows the distance sensor to be suspended at the position of the contact as a holding point and thereby to emit a detection signal vertically downward.

The distance sensor module may further include: a cushion disposed in contact with the housing and the distance sensor and configured to prevent vibration of the attachment section from being transmitted to the distance sensor.

The cushion absorbs vibration transmitted from the attachment section of the housing and thereby prevents vibration of the distance sensor for high-accuracy measurement.

The distance sensor module may further include: a cushion disposed in contact with the housing and the distance sensor and surrounding the swing axis section.

With the above configuration, the cushion absorbs vibration regardless of the direction in which the distance sensor is vibrated relative to the housing, and also prevents dust from entering the space in which the swing axis section is disposed.

The distance sensor module may be further configured such that the distance sensor is a millimeter-wave radar sensor that uses a millimeter wave as the detection signal, and the distance sensor includes a portion covering the transmission and reception section which portion is made of an insulator.

The insulator protects the outer face of the transmission and reception section. Further, the distance sensor is a millimeter-wave radar sensor that uses a millimeter wave as the detection signal. The distance sensor is thus capable of measuring the distance between the distance sensor and a measurement target without being affected by the environment as compared to a distance sensor that uses a light beam.

Another distance sensor module according to this disclosure includes: a distance sensor; and a housing, the distance sensor including: a sensor body; and a transmission and reception section connected to the sensor body and configured to emit a detection signal toward a measurement target and receive the detection signal as reflected by the measurement target, the distance sensor being of a non-contact type such that the sensor body is configured to measure a distance between the distance sensor and the measurement target as a result of the transmission and reception section receiving the detection signal, the housing including: a sensor container section containing the distance sensor; an attachment section configured to attach the sensor container section to an external attachment target; and a holder mechanism holding a portion of the distance sensor which portion is opposite to the transmission and reception section in such a manner that the distance sensor is suspended from the housing and capable of changing an orientation, the sensor container section being configured to keep the transmission and reception section so oriented due to gravity as to have a vertically downward detection direction with the attachment section attached to the attachment target.

The above distance sensor module is configured such that with the housing held with use of the attachment section, the holder mechanism holds a portion of the distance sensor which portion is opposite to the transmission and reception section in such a manner that the distance sensor is suspended from the housing and capable of changing its orientation. This allows the distance sensor to keep so oriented due to gravity that the transmission and reception section faces vertically downward. The distance sensor module is thus capable of accurately measuring the distance between the distance sensor module and a measurement target even in an inappropriate orientation.

DESCRIPTION OF EMBODIMENTS

The description below deals with an embodiment of this disclosure with reference to drawings.

[Basic Configuration]

Figure 2:
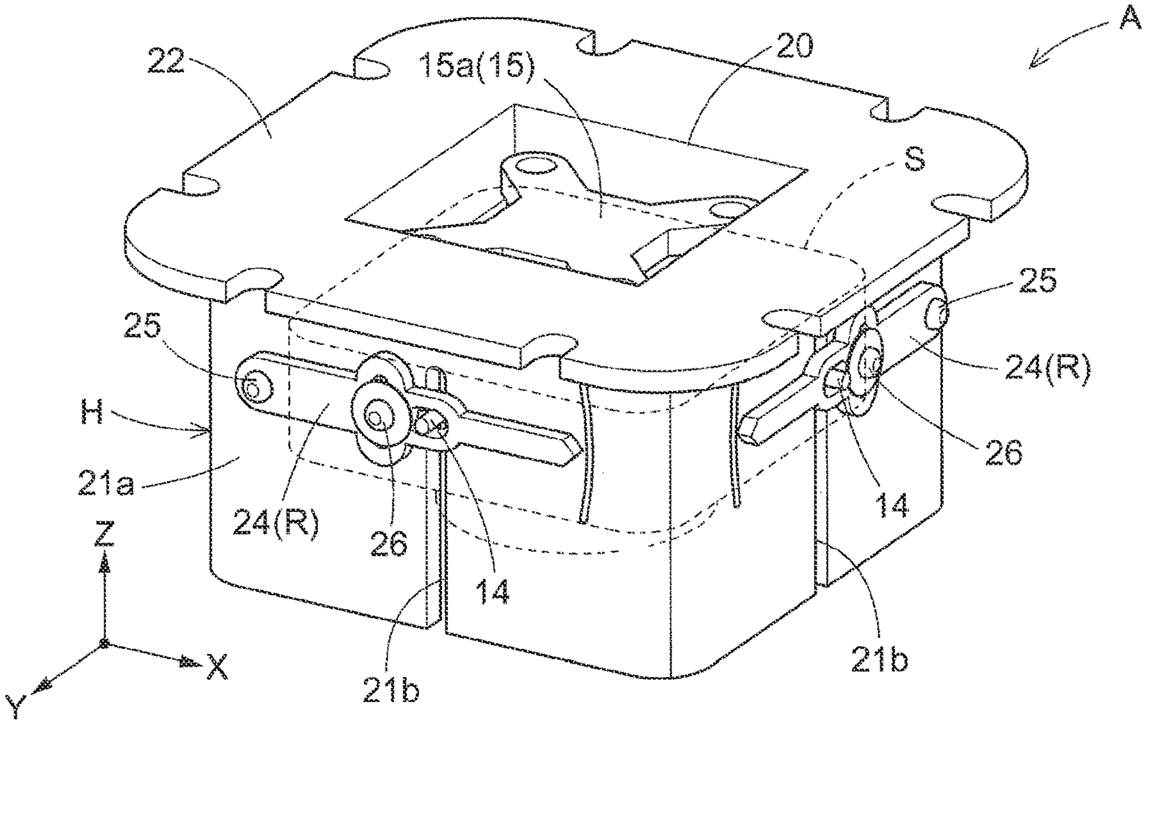
FIG. 2 is a perspective view of a distance sensor module.

FIG. 2 illustrates a distance sensor module A including a distance sensor S and a housing H containing the distance sensor S.

The distance sensor S is of a non-contact type and includes a transmission and reception section 12 (see FIG. 4) configured to emit a detection signal (millimeter wave) from its transmission and reception face 12S toward a measurement target and receive at the transmission and reception face 12S the detection signal as reflected by the measurement target to measure the distance between the distance sensor S and the measurement target.

Figure 1:
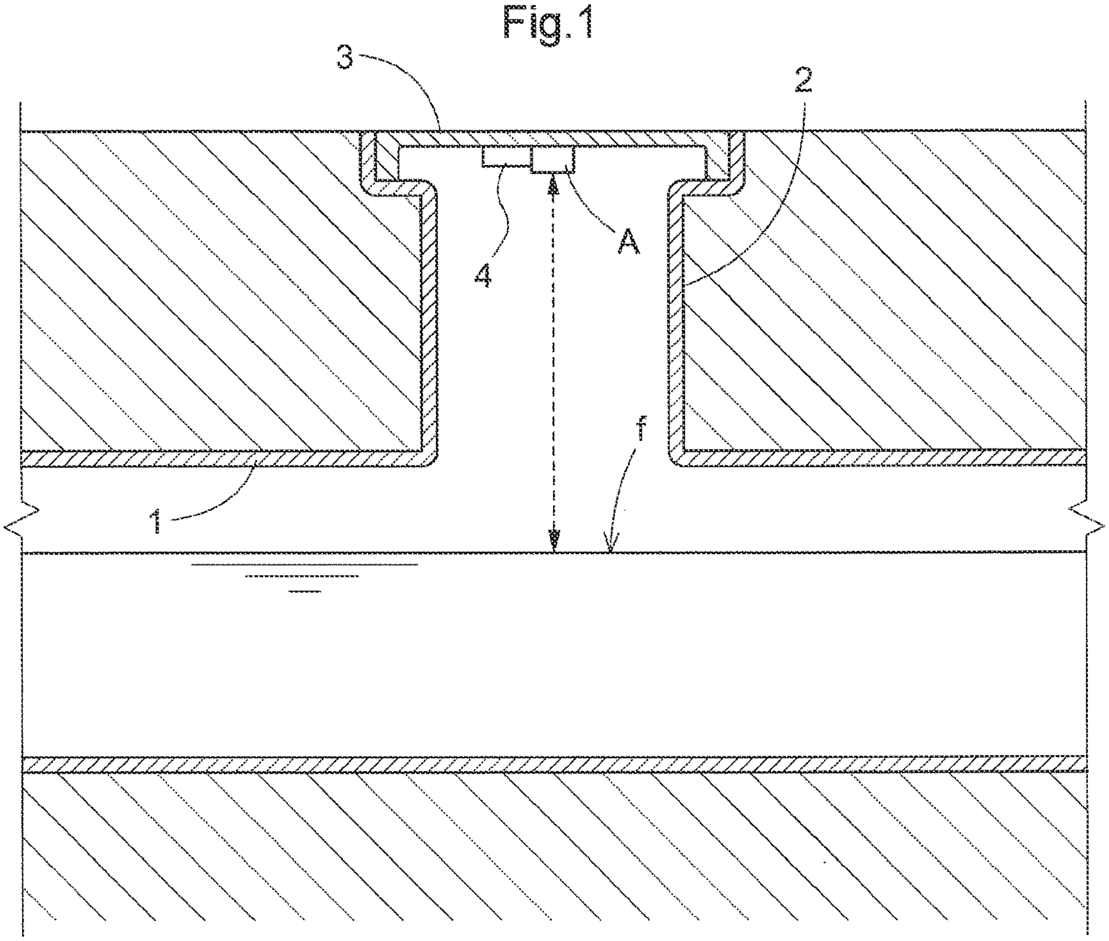
FIG. 1 is a cross-sectional view of a pipe and a cover of a manhole, illustrating how the pipe and the cover are positioned.

As illustrated in FIG. 1, the distance sensor module A as the present embodiment is disposed on the lower face of a cover 3 (which is an example of the "attachment target") of a manhole 2 for a pipe 1, and is intended to measure the level of water flowing through the pipe 1. The distance sensor module A is, in other words, designed such that the transmission and reception section 12 faces the surface f of water for the distance sensor S to measure the distance between the distance sensor S and the water surface f in a non-contact manner. The distance sensor module A is also usable for any water channel other than a pipe 1 to measure the distance between the distance sensor S and a water surface f.

The distance sensor module A is used in combination with a communication unit 4 disposed on the lower face of the cover 3. The communication unit 4 contains a battery (not illustrated in the drawings) and is configured to (i) receive from the distance sensor module A information on the distance between the distance sensor S and the water surface f as detected by the distance sensor module A and (ii) transmit the distance information wirelessly to a server or the like for managing the pipe 1.

Figure 4:
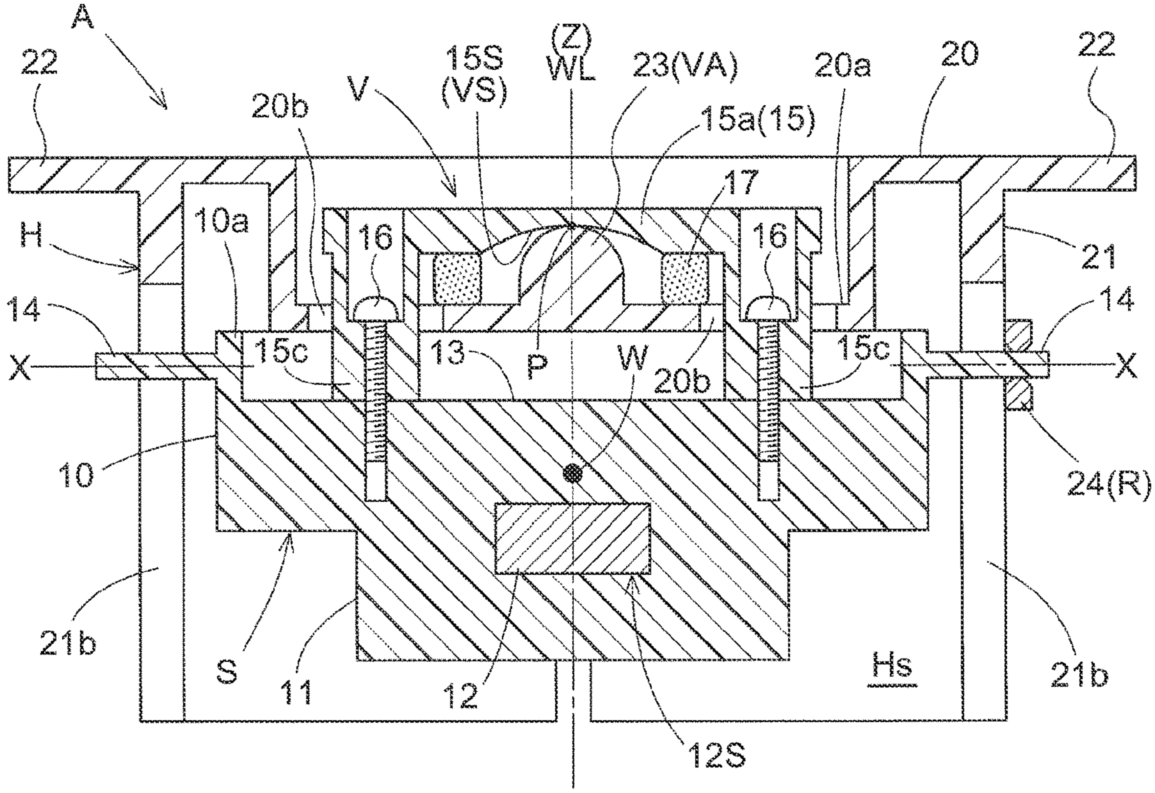
FIG. 4 is a cross-sectional side view of a distance sensor module.

The distance sensor module A is used in the orientation illustrated in FIGS. 2 and 4. The description below assumes a vertical direction on the basis of this orientation. FIGS. 2 and 4 show a Z axis to indicate the vertical direction.

The distance sensor module A includes an orientation keeper V, and is configured such that the distance sensor S (specifically, its sensor body 10) is suspended from the housing H with use of the orientation keeper V. This allows the distance sensor module A to keep so oriented that the transmission and reception section 12 emits a detection signal vertically downward from its transmission and reception face 12S. The orientation keeper V, as illustrated in FIG. 4, includes an axial member 23 (which is an example of the swing axis section VA) and a depressed surface section 15S (which is an example of the swing support VS).

[Distance Sensor in Detail]

As illustrated in FIGS. 2 to 6, the distance sensor S includes a sensor body 10 and a transmission and reception section 12 inside the sensor body 10. The sensor body 10 has a square (rectangular) shape in a plan view (that is, as viewed along the Z axis), and is provided with a cylindrical protrusion 11 at a lower face. The sensor body 10 and the protrusion 11 are integrally made of insulating resin. The transmission and reception section 12 has a transmission and reception face 12S covered by the resin.

The distance sensor S does not necessarily have a square shape in a plan view, and may alternatively have a shape such as a circular or polygonal shape. The distance sensor S may, even if not having a square shape in a plan view, include a body wall 10*a* and holder shafts 14 protruding horizontally from the body wall 10*a*, similarly to the structure illustrated in drawings such as FIGS. 3 and 6.

The cross-sectional views such as FIG. 4 show the transmission and reception section 12 as inserted in the insulating resin of the distance sensor S. The transmission and reception section 12 may alternatively be contained in a hollow defined by the outer wall of the distance sensor S.

The sensor body 10 contains a sensor control circuit (not illustrated in the drawings) configured to control the transmission and reception section 12 to receive distance information and transmit the distance information to the communication unit 4.

The transmission and reception section 12 is in the form of a millimeter-wave radar configured to emit a millimeter wave as a detection signal from the distal end face of the protrusion 11 and receive the millimeter wave as reflected by a water surface f to measure the distance between the distance sensor S and the water surface f. The transmission and reception section 12, which uses a millimeter wave as a detection signal, is capable of the measurement even with the transmission and reception face 12S covered by resin, as the detection signal passes through the resin.

The sensor body 10 has a center of gravity W substantially at the center in a plan view, under which the transmission and reception section 12 is disposed. Thus, when the distance sensor module A is oriented as illustrated in FIG. 4, the center of gravity W is on the central axis of the transmission and reception section 12 (which central axis coincides with the weight line WL of the distance sensor S). The distance sensor module A is thereby configured such that the sensor body 10 is suspended from the orientation keeper V, which is above the center of gravity W, to keep the weight line WL vertical due to gravity, the weight line WL extending through the center of gravity W and the transmission and reception section 12.

The sensor body 10 may be configured such that the transmission and reception section 12 is on the weight line WL or at the center of gravity W of the sensor body 10 to allow the transmission and reception section 12 to have a vertically downward detection direction.

Figure 3:
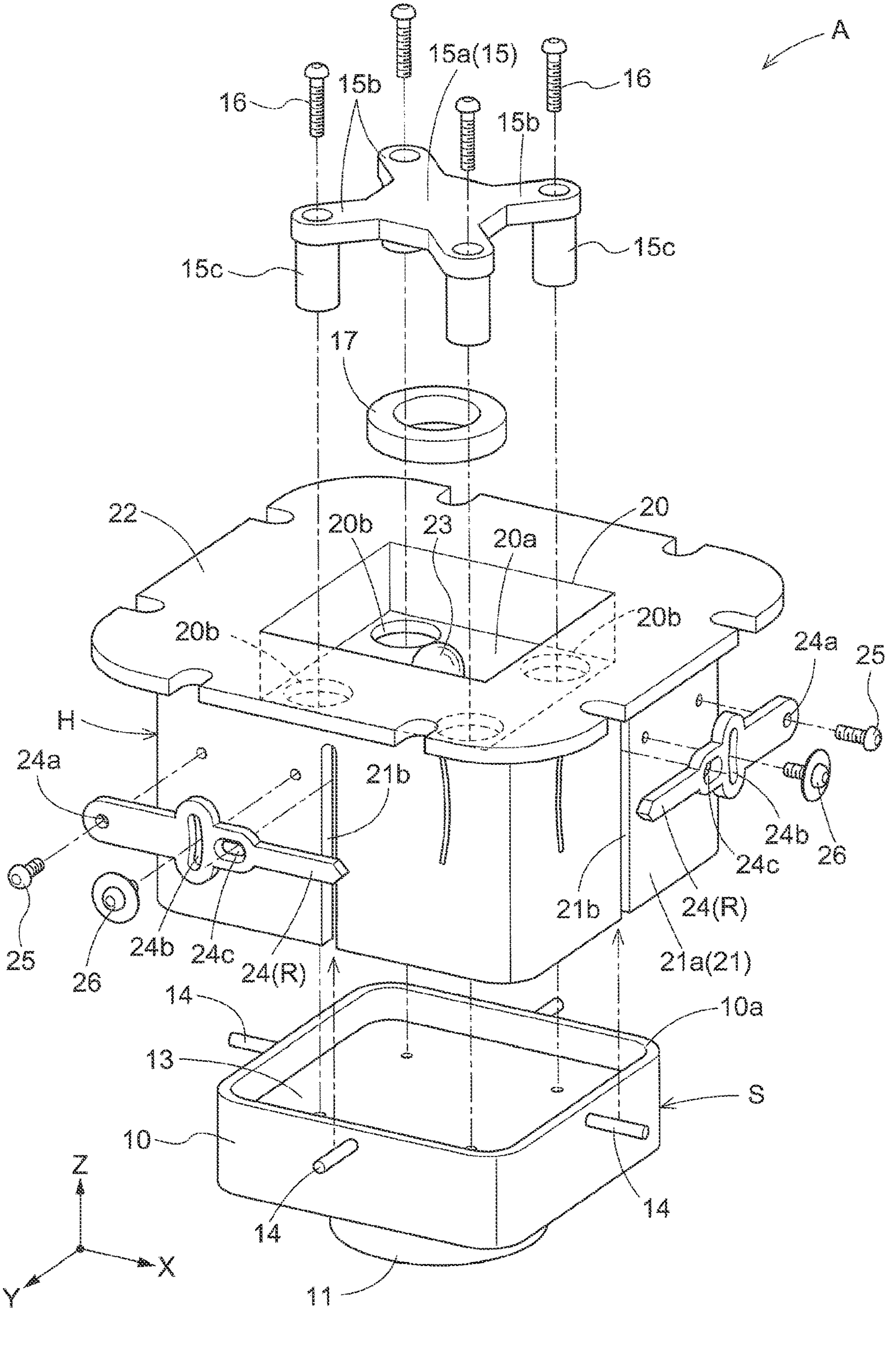
FIG. 3 is an exploded perspective view of a distance sensor module.
Figure 6:
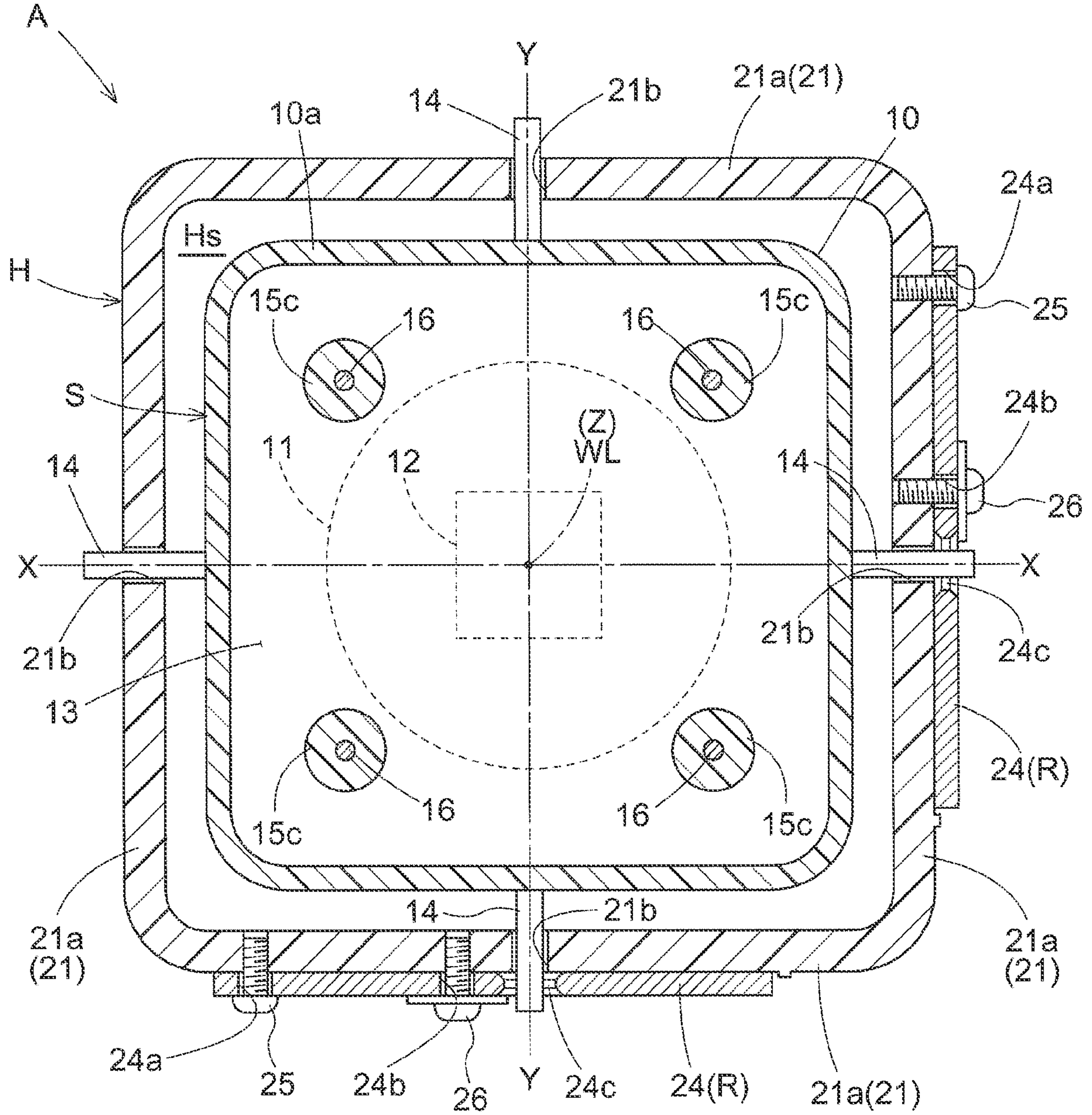
FIG. 6 is a cross-sectional plan view of a distance sensor module.

As illustrated in FIGS. 3, 4, and 6, the sensor body 10 includes a flat top wall 13 opposite to the protrusion 11 and a body wall 10*a* standing to surround the top wall 13. The body wall 10*a* includes four wall portions corresponding to the respective sides of the rectangular sensor body 10. The sensor body 10 includes four holder shafts 14 protruding horizontally from the respective wall portions.

In the case where the distance sensor S has a circular shape in a plan view, the distance sensor S includes a body wall 10*a* circular in a plan view and holder shafts 14 protruding horizontally from the circular wall. In the case where the distance sensor S has a polygonal shape in a plan view, the distance sensor S includes a body wall 10*a* polygonal in a plan view and holder shafts 14 protruding horizontally from the respective sides of the polygon. If the distance sensor S has a shape other than a circular or polygonal shape in a plan view, the distance sensor S includes a body wall 10*a* shaped accordingly and holder shafts 14 protruding horizontally from the outer surface of the body wall 10*a*.

The four holder shafts 14 each have a circular cross-sectional shape. Each pair of opposite holder shafts 14 are coaxial with each other. FIGS. 3, 4, and 6 show an X axis to indicate one of the two axes orthogonal to each other, a Y axis to indicate the other axis, and a vertical Z axis orthogonal to both the X and Y axes (see also FIG. 2).

As illustrated in FIG. 6, the X axis crosses the Y axis on the weight line WL in a plan view.

The distance sensor S is provided with a holder plate 15 apart from and above the top wall 13 of the sensor body 10. The holder plate 15 includes a plate body 15*a*, four arms 15*b*, and four protrusions 15*c*. The plate body 15*a* is parallel to the top wall 13. The arms 15*b* extend outward from the outer edge of the plate body 15*a*. The protrusions 15*c* protrude from the respective distal ends of the arms 15*b* downward along the vertical Z axis.

The protrusions 15*c* each have a hole open upward. The distance sensor S is provided with four screws 16 disposed through the respective holes and screwed in the sensor body 10 to couple the holder plate 15 to the distance sensor S. As illustrated in FIG. 4, the housing H includes a bottom wall 20*a* with through holes 20*b*, and the holder plate 15 is above the bottom wall 20*a* as a result of the holder plate 15 having its protrusions 15*c* through the respective through holes 20*b* to be coupled to the distance sensor S below the bottom wall 20*a* (see also FIG. 3).

As illustrated in FIG. 4, the plate body 15*a* includes at a lower face thereof a depressed surface section 15S (swing support VS) open downward. The depressed surface section 15S has a hemispherical inner surface with its deepest portion (that is, that portion farthest apart from the bottom wall 20*a* along the vertical Z axis) on the weight line WL.

[Housing in Detail]

The housing H includes a top wall 20, a vertical wall 21, and an attachment section 22. The top wall 20 has a square (rectangular) shape in a plan view. The vertical wall 21 extends downward from the outer edge of the top wall 20. The attachment section 22 is a flange extending outward from the outer edge of the top wall 20. The top wall 20, the vertical wall 21, and the attachment section 22 are integrally made of resin.

As illustrated in FIGS. 3 and 6, the vertical wall 21 includes four vertical wall portions 21*a* joined with one another at the corners, and is in the form of a box open downward. The vertical wall portions 21*a* define inside a sensor container section Hs containing the sensor body 10 in such a manner that allows the sensor body 10 to change its orientation within a predetermined space.

The top wall 20 has a recess with a flat bottom wall 20*a* at a central portion in a plan view. The housing H includes an axial member 23 (swing axis section VA) integral with the bottom wall 20*a* and disposed at the center of the bottom wall 20*a* in a plan view. The axial member 23 protrudes upward and has a gradually smaller diameter toward the upper end. The bottom wall 20*a* has four through holes 20*b* around the axial member 23. The axial member 23 is in the form of a tapered rotor rotatable about a vertical axis.

The four vertical wall portions 21*a* each have a vertical slit 21*b* at the center along the width. The slits 21*b* receive the respective holder shafts 14 of the sensor body 10 with the distance sensor module A as assembled. The distance sensor module A is configured such that the vertical wall 21 protrudes downward by such an amount that when the distance sensor S has been tilted maximally, no portion of the distance sensor S protrudes downward from the lower end of the vertical wall 21 (that is, the lower end of the sensor container section Hs) in a side view (that is, as viewed perpendicularly to the vertical Z axis). With this configuration, the vertical wall 21 protects the distance sensor S when the cover 3 of the manhole 2 has given a strong impact due to its weight to the distance sensor module A on the cover 3 such as when the cover 3 has been dropped onto the ground by mistake.

[Orientation Keeper in Detail]

As illustrated in FIG. 4, the orientation keeper V includes an axial member 23 and a depressed surface section 15S. The axial member 23 (swing axis section VA) is on the same side as the housing H. The depressed surface section 15S (swing support VS) is on the same side as the distance sensor S and at the lower face of the holder plate 15.

The orientation keeper V is configured such that the axial member 23 has an upper end in contact with the depressed surface section 15S of the holder plate 15 at the swing center so that the distance sensor S is suspended from the housing H in a stable orientation. The axial member 23 having an upper end in contact with the depressed surface section 15S at a holding point P as above allows the distance sensor S to swing about the holding point P (swing center) relative to the housing H. When the housing H is horizontal as illustrated in FIG. 4, the holding point P is in contact with the deepest portion of the depressed surface section 15S and on the weight line WL.

Figure 5:
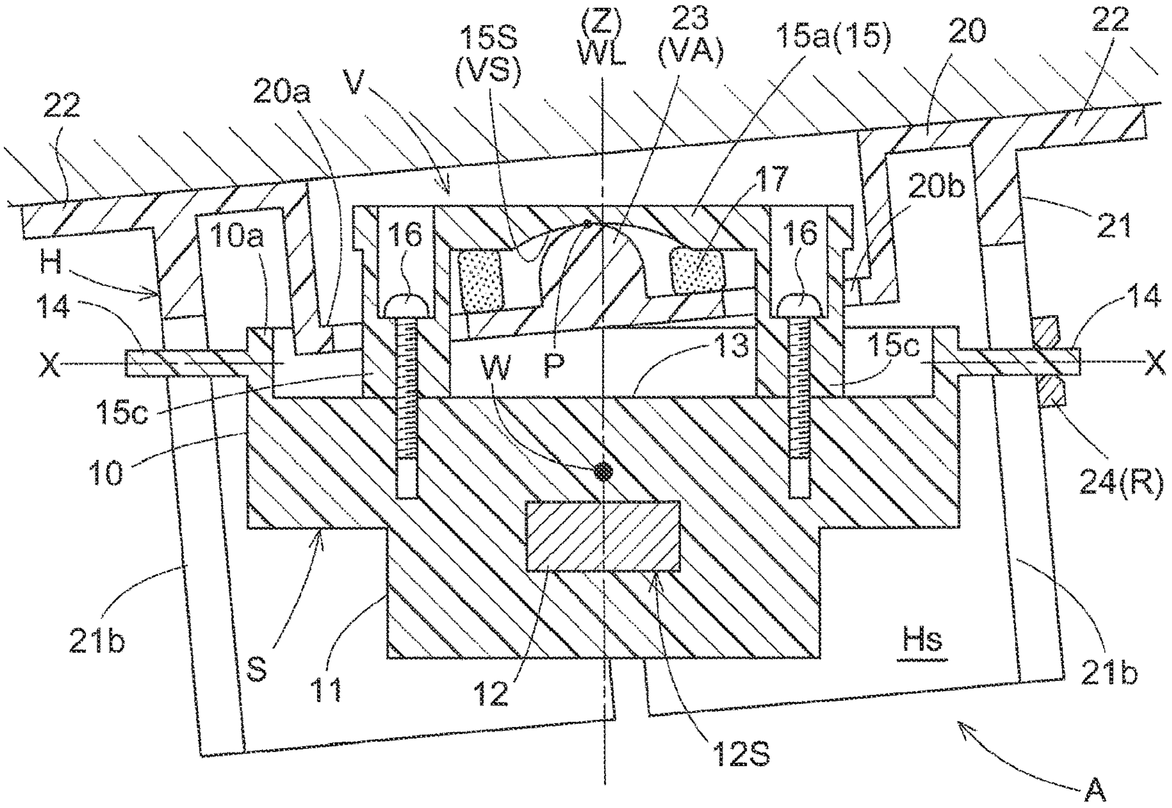
FIG. 5 is a cross-sectional side view of a distance sensor module with a tilted housing.

The orientation keeper V is configured as follows: If the housing H, which is normally horizontal as illustrated in FIG. 4, is no longer horizontal as illustrated in FIG. 5, it means that the holding point P has moved along the depressed surface section 15S, so that the swing center of the axial member 23, which is in contact with the depressed surface section 15S, has moved as well. Even in such cases, the distance sensor S keeps its weight line WL vertical to extend through the swing center and the center of gravity W, with the result of the distance sensor S being kept horizontal. The orientation keeper V, as described above, allows the distance sensor S to change its orientation relative to the housing H with the holding point P at the center and to be oriented stably in such a manner as to keep its weight line WL vertical due to gravity on the distance sensor S. This allows the transmission and reception section 12 to have a vertically downward detection direction.

[Restrictor and Others in Detail]

As illustrated in FIGS. 2, 3, and 6, the distance sensor module A includes a restrictor R configured to limit how much the distance sensor S is capable of changing its orientation relative to the housing H. The restrictor R includes two restrictor arms 24, one of which is on the outer face of one of the two vertical wall portions 21*a* oriented along the X axis, and the other one of which is on the outer face of one of the two vertical wall portions 21*a* oriented along the Y axis.

The restrictor arms 24 each have a base end hole 24*a* at its base end, and are each provided with a swing holder shaft 25 in the form of a screw disposed through the corresponding base end hole 24*a* and fixed to the corresponding vertical wall portion 21*a*. This allows each restrictor arm 24 to be held by the corresponding swing holder shaft 25 in such a manner as to be swingable about the swing holder shaft 25. The restrictor arms 24 each have a curved elongated hole 24*b* at an intermediate portion, and are each provided with a restrictor shaft 26 in the form of a screw disposed through the corresponding elongated hole 24*b* and fixed to the corresponding vertical wall portion 21*a*. This defines limits on the swing of each restrictor arm 24. The restrictor arms 24 each have, near the elongated hole 24*b*, a cooperation hole 24*c* through which the corresponding holder shaft 14 is disposed. This allows each restrictor arm 24 to swing about the corresponding swing holder shaft 25 in response to a vertical movement of the corresponding holder shaft 14.

The restrictor R for the present embodiment is configured not such that the restrictor arms 24 illustrated in drawings such as FIGS. 2, 3, and 6 each function on its own, but such that the restrictor arms 24 each function with use of such elements as the corresponding elongated hole 24*b* and restrictor shaft 26. The restrictor R may alternatively include members in contact with respective outer faces of the distance sensor S or with respective holder shafts 14 to define limits on the swing of the distance sensor S.

The restrictor arms 24 may each be fastened to the corresponding vertical wall portion 21*a* with use of the corresponding restrictor shaft 26 in such a manner as to be incapable of swinging, in which case the restrictor shaft 26 serves as a fixing member. The fixing members prevent the respective restrictor arms 24 from swinging, and thereby prevent the distance sensor S from changing its orientation. The restrictor R may use as fixing members a pair of screws or pins disposed through each elongated hole 24*b* or members in contact with respective outer faces of the distance sensor S to define the swing limits.

When the distance sensor S is horizontal, the two holder shafts 14 for which the restrictor arms 24 are provided are each at a basic position illustrated in FIG. 2, so that the restrictor arms 24 are horizontal. When the distance sensor S becomes inclined from the horizontal direction relative to the housing H, the holder shafts 14 through the respective cooperation holes 24*c* are moved to above or below the basic position, which swings each restrictor arm 24 about the corresponding swing holder shaft 25 disposed through the corresponding base end hole 24*a*.

The above configuration allows each restrictor arm 24 to (i) swing about the corresponding swing holder shaft 25 in response to the distance sensor S swinging relative to the housing H and (ii) stop its swing in response to the corresponding restrictor shaft 26 coming into contact with a longitudinal end of the corresponding elongated hole 24*b*. This defines limits on the swing of the distance sensor S.

As illustrated in FIGS. 3 and 4, the distance sensor module A includes a ring-shaped cushion 17 disposed outward of and apart from the axial member 23 and sandwiched between the upper face of the bottom wall 20*a* and the lower face of the holder plate 15. The cushion 17 is made of a material such as rubber or flexibly deformable resin.

The distance sensor module A is configured such that the cushion 17 lessens, for example, external vibration or impact on the distance sensor S. The cushion 17 absorbs vibration of the distance sensor S to allow the distance sensor S to return to and stop in the horizontal orientation earlier. This prevents inaccurate sensing by the distance sensor S. The cushion 17 also prevents dust from entering the space between the tapered portion of the axial member 23 and the depressed surface section 15S of the holder plate 15.

Advantages of Embodiment

The distance sensor module A is configured such that the attachment section 22 of the housing H is screwed or otherwise fixed to the lower face of a cover 3 of a manhole 2. Fixing the distance sensor module A to the lower face of a cover 3 as such allows the distance sensor module A to keep its weight line WL vertical due to gravity, the weight line WL extending through the center of gravity W and the transmission and reception section 12. When the cover 3 is horizontal with the distance sensor module A fixed as above, the orientation keeper V, as illustrated in FIG. 4, causes the housing H to hold the weight of the distance sensor S with the upper end of the axial member 23 in contact with the center of the depressed surface section 15S of the holder plate 15 at the holding point P. This allows the distance sensor S to be suspended from the housing H in a stable orientation.

When, for instance, the cover 3 becomes tilted or otherwise oriented inappropriately as illustrated in FIG. 5 after maintenance of the manhole 2, the distance sensor S swings relative to the housing H due to gravity with the tapered end of the axial member 23 in contact with the inner surface of the depressed surface section 15S. This allows the distance sensor S to remain horizontal and keep its weight line WL vertical. This in turn allows the transmission and reception section 12 to emit a detection signal from its transmission and reception face 12S in the vertical direction for accurate measurement of a water surface f.

The distance sensor module A may be disposed on a bridge or in a facility on a river terrace or the like for measurement of the water level of a river. In such cases, while the surface on which the distance sensor module A is disposed such as a horizontal iron pole may become inclined over time, the distance sensor module A allows the distance sensor S to swing due to its self weight and remain horizontal. The distance sensor module A may be attached to the back face of the cover of a septic tank or the ceiling of the tank for measurement of the level of water in the tank. The distance sensor module A is also usable for measurement of the level of water in a paddy field or a hydroponic field.

The distance sensor module A is configured in particular such that the distance sensor S remains inside the sensor container section Hs even if the distance sensor S has changed its orientation relative to the housing H. The restrictor arms 24 limit how much the distance sensor S changes its orientation relative to the housing H, and thereby prevent the distance sensor S from greatly changing its orientation relative to the housing H and coming into unintended contact with the inner surface of the vertical wall 21.

The distance sensor module A is configured such that the vertical wall 21 protrudes downward by such an amount that when the distance sensor S has been tilted maximally, no portion of the distance sensor S protrudes downward from the lower end of the vertical wall 21 (that is, the lower end of the sensor container section Hs) in a side view (that is, as viewed perpendicularly to the vertical Z axis). With this configuration, the vertical wall 21 protects the distance sensor S when the cover 3 of the manhole 2 has given a strong impact due to its weight to the distance sensor module A on the cover 3 such as when the cover 3 has been dropped onto the ground by mistake.

The distance sensor module A includes a cushion 17 configured to prevent the distance sensor S from being greatly moved relative to the housing H as a result of the distance sensor module A vibrating due to, for instance, external vibration or impact. This prevents erroneous measurement.

The plate body 15*a* includes at a lower face thereof a depressed surface section 15S (swing support VS) open downward, that is, in the direction in which gravity acts. This lets a water droplet or dust on a portion of contact between the axial member 23 and the depressed surface section 15S drop therefrom due to gravity, and thereby allows the distance sensor S to reliably swing inside the sensor container section Hs of the housing H.

Alternative Embodiments

This disclosure may be configured as below in addition to the embodiments described above. Any element described below that functions as described for the embodiments above is assigned with the same reference numeral as that for embodiments above.

Figure 7:
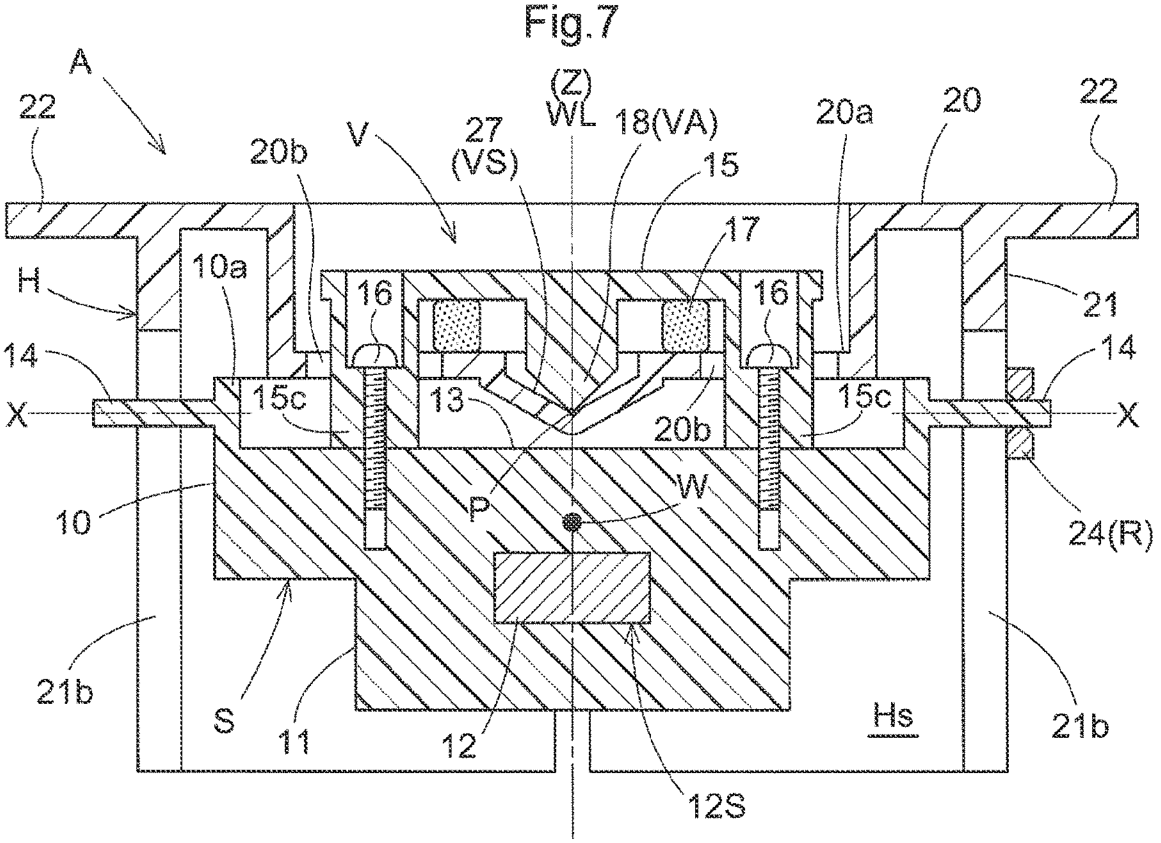
FIG. 7 is a cross-sectional side view of a distance sensor module as alternative embodiment (a).

(a) The distance sensor module A may, as illustrated in FIG. 7, include an orientation keeper V including an axial body 18 and a depressed section 27. The axial body 18 (swing axis section VA) protrudes downward from the lower face of the holder plate 15. The depressed section 27 (swing support VS) is in the bottom wall of the housing H and open upward.

Alternative embodiment (a) is configured such that the axial body 18 has a tapered end and that the depressed section 27 has a V-shaped cross section, that is, a deep central portion, and is in the form of a rotor rotatable about the weight line WL of the distance sensor S. This allows the axial body 18 to have a lower end in contact with the deepest portion of the depressed section 27 due to gravity on the distance sensor S, the contact portion being a holding point P.

Alternative embodiment (a) is compared to the embodiment described above under "Description of Embodiments" (hereinafter referred to as "first embodiment") as follows: The axial body 18 and the depressed section 27 (corresponding to the depressed surface section 15S for the first embodiment) are upside down in comparison to their corresponding elements. Alternative embodiment (a) allows the distance sensor S to be suspended from the housing H with use of the orientation keeper V, similarly to the first embodiment.

Alternative embodiment (a) is similar in configuration to the first embodiment in that it includes a cushion 17 made of a material such as rubber or flexibly deformable resin and sandwiched between the lower face of the holder plate 15 and the upper face of the bottom wall 20*a*. Alternative embodiment (a) is similar to the first embodiment in that it includes a pair of restrictor arms 24.

Figure 8:
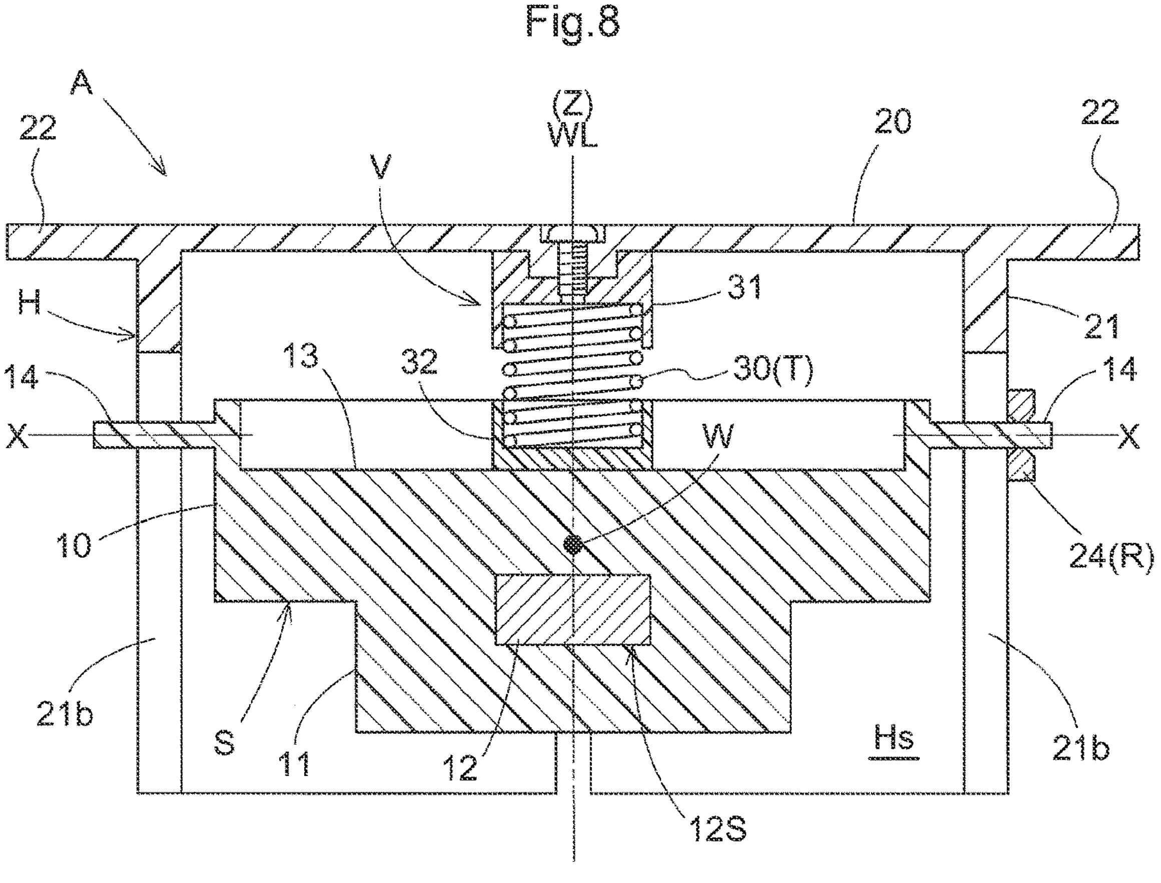
FIG. 8 is a cross-sectional side view of a distance sensor module as alternative embodiment (b).

(b) The distance sensor module A may, as illustrated in FIG. 8, include an orientation keeper V including a coil spring 30 as a holder mechanism T connecting the lower face of the top wall 20 of the housing H with the top wall 13 of the sensor body 10 of the distance sensor S.

Alternative embodiment (b) is configured such that the housing H does not include an element corresponding to the bottom wall 20*a* for the first embodiment. Alternative embodiment (b) includes an upper holder 31 and a lower holder 32. The upper holder 31 protrudes downward from the center of the lower face of the flat top wall 20. The lower holder 32 is at the center of the top wall 13.

The upper holder 31 has a lower end portion in the form of a cylinder open downward. The lower holder 32 has an upper end portion in the form of a cylinder open upward. The coil spring 30 has an upper end fitted in the cylindrical portion of the upper holder 31 and a lower end fitted in the cylindrical portion of the lower holder 32.

Alternative embodiment (b) is configured such that the distance sensor S is suspended from the housing H with use of the coil spring 30. This allows the distance sensor S to keep its weight line WL vertical regardless of how the housing H is oriented.

(c) Alternative embodiment (b) may be modified such that the holder mechanism T is not a coil spring 30 but a synthetic fiber string or a flexibly deformable wire.

(d) The distance sensor S may be configured to use as the detection signal an ultrasonic wave or a light beam such as of infrared radiation or visible radiation.

The invention claimed is:

1. A distance sensor module, comprising:
a distance sensor; and
a housing,
the distance sensor including:
a sensor body; and
a transmission and reception section connected to the sensor body and configured to emit a detection signal toward a measurement target and receive the detection signal as reflected by the measurement target,
the distance sensor being of a non-contact type such that the sensor body is configured to measure a distance between the distance sensor and the measurement target as a result of the transmission and reception section receiving the detection signal,
the housing including:
a sensor container section containing the distance sensor; and
an attachment section configured to attach the sensor container section to an external attachment target,
the distance sensor being suspended from the housing with use of a holder plate,
the sensor container section being configured to keep the transmission and reception section so oriented due to gravity as to have a vertically downward detection direction with the attachment section attached to the attachment target, the distance sensor being contained in the sensor container section in such a manner as to be capable of swinging to change an orientation relative to the housing, the attachment section of the housing including a swing axis section, whereas the distance sensor including a swing support holding the swing axis section, the swing support having a center vertically upward of a center of gravity of the distance sensor, the swing axis section protruding upward and having a gradually smaller diameter toward an upper end thereof, and the swing support being a depressed surface section open downward and in contact with the upper end of the swing axis section.

2. The distance sensor module according to claim 1, wherein the transmission and reception section faces the measurement target, and the distance sensor has a center of gravity on a central axis of the transmission and reception section.

3. The distance sensor module according to claim 2, wherein the sensor container section contains the distance sensor in such a manner that allows the distance sensor to change an orientation within a predetermined space.

4. The distance sensor module according to claim 3, wherein the sensor container section has a lower end protruding downward by such an amount that when the distance sensor has changed an orientation within a predetermined space, no portion of the distance sensor protrudes downward from the lower end in a side view.

5. The distance sensor module according to claim 3, further comprising:

a restrictor configured to limit a change of an orientation of the distance sensor relative to the sensor container section.

6. The distance sensor module according to claim 2, wherein the sensor container section has a lower end protruding downward by such an amount that when the distance sensor has changed an orientation within a predetermined space, no portion of the distance sensor protrudes downward from the lower end in a side view.

7. The distance sensor module according to claim 2, further comprising:

a restrictor configured to limit a change of an orientation of the distance sensor relative to the sensor container section.

8. The distance sensor module according to claim 1, wherein the sensor container section contains the distance sensor in such a manner that allows the distance sensor to change an orientation within a predetermined space.

9. The distance sensor module according to claim 8, wherein the sensor container section has a lower end protruding downward by such an amount that when the distance sensor has changed an orientation within a predetermined space, no portion of the distance sensor protrudes downward from the lower end in a side view.

10. The distance sensor module according to claim 8, further comprising:

a restrictor configured to limit a change of an orientation of the distance sensor relative to the sensor container section.

11. The distance sensor module according to claim 1, wherein the sensor container section has a lower end protruding downward by such an amount that when the distance sensor has changed an orientation within a predetermined space, no portion of the distance sensor protrudes downward from the lower end in a side view.

12. The distance sensor module according to claim 1, further comprising:

a restrictor configured to limit a change of an orientation of the distance sensor relative to the sensor container section.

13. The distance sensor module according to claim 1, further comprising:

a fixing member configured to fix the distance sensor in such a manner as to prevent the distance sensor from changing an orientation.

14. The distance sensor module according to claim 1, further comprising:

a cushion disposed in contact with the housing and the distance sensor and configured to prevent vibration of the attachment section from being transmitted to the distance sensor.

15. The distance sensor module according to claim 1, further comprising:

a cushion disposed in contact with the housing and the distance sensor and surrounding the swing axis section.

16. The distance sensor module according to claim 1, wherein the distance sensor is a millimeter-wave radar sensor that uses a millimeter wave as the detection signal, and the distance sensor includes a portion covering the transmission and reception section which portion is made of an insulator.

* * * * *